3,140,293
ANHYDRO apo MITOMYCIN COMPOUNDS

James Burns Patrick, Suffern, N.Y., and John Schurr Webb, Woodcliff Lake, N.J., assignors to American Cyanamid Company, Stamford, Conn., a corporation of Maine
No Drawing. Filed June 7, 1962, Ser. No. 200,632
7 Claims. (Cl. 260—319)

This invention relates to novel antibacterial substances which may be represented by the following general formula:

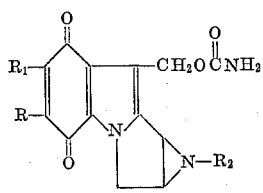

wherein R is lower alkyl, $R_1$ is methoxy or amino and $R_2$ is hydrogen or methyl.

The novel products of this invention are orange colored crystalline solids having very weakly basic properties. They are relatively insoluble in water, ethyl ether and petroleum ether. They are very slightly soluble in solvents such as benzene, toluene, chloroform, and the like; but relatively soluble in ethanol, pyridine, dimethylformamide, and the like. The infrared and ultraviolet absorption patterns are characteristic of the new products and provide preferred means of distinguishing and identifying the new substances.

The new compounds are active in vitro against a variety of microorganisms including gram-positive and gram-negative bacteria. Tests in mice in vivo demonstrate that the new antibacterials are extremely active when administered orally or subcutaneously in protecting mice infected with a lethal dose of *Staphylococcus aureus* strain Smith.

Certain of the compounds are prepared from mitomycin A or mitomycin B, a group of novel antibiotics having significant antitumor activity described by Hata, et al. in J. Antibiotics, Ser. A, IX, No. 4, 141 (July 1956).

Thus in order to prepare the product which may be designated anhydro apo mitomycin B wherein in the above formula R is methyl, $R_1$ is methoxy and $R_2$ is methyl, mitomycin B is preferably dissolved in a suitable polar solvent such as water, dioxane, 2-methoxyethanol, 2-ethoxyethanol, ethyl acetate, methanol, ethanol, dimethylformamide, dimethylsulfoxide, dimethyl acetamide, etc., and the solution is contacted with hydrogen in the presence of a noble metal catalyst, preferably finely-divided metallic palladium or other metal of the platinum family.

The pure metal may be used or the catalyst may be suspended on one of the common carriers such as finely-divied alumina, activated charcoal, diatomaceous earth, etc. The hydrogenation may be carried out at temperatures ranging from about 0° C. to about 50° C. and preferably at about room temperature, that is, around 25° C., and at hydrogen pressures of about one atmosphere.

A concentration of catalyst of at least 1% by weight of the starting material is necessary and up to about 100% by weight may be used; 10-20% is usual. The hydrogenation is usually carried out until one mole of hydrogen has been absorbed, at which time the rate of absorption tends to diminish. Some caution must be exercised in not continuing the hydrogenation for an undue length of time as further and undesirable reductions may take place.

After completion of the hydrogenation the reduced product is recovered by any desired means, as by removal of the catalyst and concentration of the solution. The reduced product is then oxidized with air, oxygen, benzoquinone or similar oxidizing agents and the final product may be recovered from the reaction mixture by filtration, washing with alcohol, and vacuum drying. The final product may be purified by recrystallization from ethanol or pyridine or dimethylformamide, etc., in a standard manner.

Alternatively, the product designated as N-methylmitomycin A of the formula:

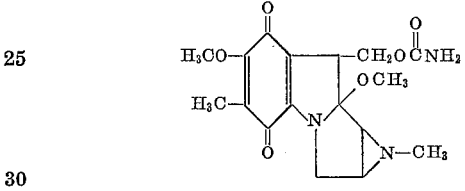

and which forms the subject matter of the copending application of Meyer, et al., Serial No. 200,631 filed concurrently herewith may be used as the starting material for the preparation of anhydro apo mitomycin B. The conditions for the catalytic hydrogenation of N-methylmitomycin A and subsequent air-reoxidation are substantially identical to those described above in connection with the reduction and oxidation of mitomycin B.

The conditions for the preparation of the product which may be designated anhydro apo mitomycin A, that is wherein the above formula R is methyl, $R_1$ is methoxy and $R_2$ is hydrogen, may be substantially identical with those outlined above in connection with the preparation of anhydro apo mitomycin B.

In order to prepare the product which may be designated anhydro apo porfiromycin, that is where in the above formula R is methyl, $R_1$ is amino and $R_2$ is methyl, it is necessary merely to subject anhydro apo mitomycin B to treatment with liquid ammonia for a sufficient length of time to accomplish the desired amidation. The conditions of the reaction are not critical and may be carried out at room temperature and for a period of time of about 2 to 20 hours.

The new products of this invention have broad-spectrum antibacterial activity. The antibacterial spectrum of the new compounds, representing the amount required to inhibit the growth of various typical bacteria, was determined in a standard manner by the agar-dilution streak-plate technique which is commonly used in testing new antibiotics. The minimal inhibitory concentrations expressed in gammas per milliliter of the new products against various test organisms are reported in the table below. For comparison purposes the antibacterial spectrum of mitomycin B is also included.

TABLE 1

| Organism | Anhydro apo Mitomycin B | Anhydro apo Mitomycin A | Anhydro apo Porfiromycin | Mitomycin B |
| --- | --- | --- | --- | --- |
| Mycobacterium smegmatis ATCC 607 | 10 | 1.25 | | |
| Staphylococcus aureus 209P | 1.5 | 0.64 | 25 | 20 |
| Sarcina Lutea 1001 | 0.62 | 0.04 | 25 | 5 |
| Bacillus subtilis ATCC 6633 | 0.62 | 0.16 | 3.1 | 5 |
| Streptococcus faecalis ATCC 8043 | 2.5 | 2.5 | 125 | >20 |
| Streptococcus pyogenes C203 | 0.02 | 0.02 | 1.5 | 0.62 |
| Streptococcus pyogenes NY-5 | 0.15 | | | 1.25 |
| Streptococcus γ No. 11 | 2.5 | 1.25 | >25 | 20 |
| Staphylococcus albus No. 69 | 0.16 | 0.16 | 25 | 10 |
| Streptococcus β No. 80 | 2.5 | 1.25 | >25 | 20 |
| Staphylococcus aureus NY 104 | 2.5 | | | 20 |
| Bacillus Cereus No. 5 | 0.62 | 1.25 | 25 | 20 |
| Klebsiella pneumoniae | 2.5 | 1.25 | >25 | 20 |
| Alcaligenes sp. ATCC 10153 | 2.5 | 5 | >25 | >20 |
| Corynebacterium xerosis NRRL B-1397 | 0.62 | 0.02 | 12.5 | 5 |
| Salmonella gallinarum | 10 | 20 | >25 | >20 |
| Escherichia coli No. 22 | 2.5 | 1.25 | >25 | >20 |
| Klebsiella pneumoniae A Strain AD | 0.62 | 1.25 | >25 | >20 |

As indicated, the new products are extremely effective in vivo against certain standardized infections in mice such as *Staphylococcus aureus* strain Smith.

*Staphylococcus aureus* strain Smith has been studied at the Rockefeller Institute and described by J. M. Smith and R. J. Dubos in Journ. Expt. Med. 103, 87 (1956). *Staphylococcus aureus* strain Smith is coagulase positive, tellurite negative and is sensitive to tetracycline, penicillin, streptomycin, erythromycin, carbomycin, neomycin, chloramphenicol and novobicin in vitro. Attempts have been made for phage typing of this strain, but it has been determined that it is non-typable.

Anhydro apo mitomycin B when administered in a single subcutaneous dose is effective at a level as low as 1 mg./kg. in protecting 93% of the mice infected with a lethal dose of *Staphylococcus aureus* strain Smith, which means and $ED_{50}$ of 0.5–1.0 mg./kg. of body weight. Under the same conditions mitomycin B protected only 33% of the mice. All infected non-treated controls died within 1–2 days. Under these test conditions the new product is from 2–4 times as active as mitomycin B and less than ⅛ times as toxic.

Under the same test conditions against *Staphylococcus aureus* strain Smith, anhydro apo porfiromycin gave an $ED_{50}$ of 2–8 mg./kg. of body weight.

Under the same test conditions against *Staphylococcus aureus* strain Smith except that the drug was administered by a single oral tubing dose, anhydro apo mitomycin A gave an $ED_{50}$ of 8–16 mg./kg. of body weight.

The invention will be described in greater detail in conjunction with the following specific examples in which the parts are by weight unless otherwise specified.

EXAMPLE 1

*Preparation of Anhydro apo Mitomycin B*

Twenty-five and four-tenths parts of mitomycin B were added to a suspension of 25 parts of platinum oxide in 3,000 parts of N,N-dimethyl-formamide under an atmosphere of hydrogen in a hydrogenation apparatus. The reaction mixture was stirred until the color changed from blue to colorless and 1 mole of hydrogen had been consumed. The catalyst was then removed by filtration through diatomaceous earth and the filtrate evaporated at low temperature and pressure. The dried residue was taken up in 1,000 parts of absolute ethanol and air bubbled through the solution for ten minutes. The orange crystals that formed after air oxidation were removed by filtration, washed with a little ethanol and vacuum dried. The yield of the crude orange crystals was 11 parts. Additional material was obtained from the mother liquor. The product was purified by recrystallization from pyridine or ethanol.

*Analysis.*—Calculated for $C_{16}H_{17}N_3O_5$: C, 58.00; H, 5.77; N, 12.68. Found: C, 58.63; H, 5.47; N, 12.61.

EXAMPLE 2

*Preparation of N-Methyl Mitomycin A*

A solution of 41.5 mg. of sodium bicarbonate in 1.25 of water was treated with 1.25 ml. of dimethylformamide and 10 mg. of mitomycin A, then 0.5 ml. of acid-free methyl iodide was added. The mixture was stirred in a closed container for about five hours and then allowed to stand overnight at room temperature. The above reacton mixture was aerated with nitrogen to remove excess methyl iodide and then evaporated to dryness in vacuo. The residue was extracted with chloroform and the extract, after evaporation to dryness, was extracted with ether. Evaporation of the ether solution gave N-methyl mitomycin A. Further purification was effected by liquid-liquid partition chromatography. The purified product (6.8 mg.) was crystallized from carbon tetrachloride and heptane.

EXAMPLE 3

*Preparation of Anhydro apo Mitomycin B*

Two parts of N-methyl mitomycin A, prepared in Example 2, were reduced in 300 parts of N,N-dimethylformamide with hydrogen and 0.2 part of platinum oxide. The purple solution became colorless after reduction. After removing the catalyst, and oxidizing, the solvent was removed at low temperature state to give an orange residue. The crude product was crystallized from ethanol. The yield of orange crystals was 0.9 part after filtering and drying in vacuo. The product is identical with that obtained by the reduction of mitomycin B in Example 1.

EXAMPLE 4

*Preparation of Anhydro apo Mitomycin A*

A solution of 25 mg. of mitomycin A in 3 ml. of dimethylformamide was reduced with hydrogen using 2.5 mg. of $PtO_2$ catalyst until the reaction color was pale yellow. The reaction was filtered, washed with 1 ml. of dimethylformamide, and air-oxidized for 5 minutes. The solvent was removed under vacuum without heating and the crude product purified chromatographically using a cyclohexane; EtOAc, dimethylformamide; $H_2O$ (110; 90; 40; 5) solvent system. Light orange crystals were obtained from ethyl acetate in 21% weight yield, M.P. 205–250 decomp.

EXAMPLE 5

*Preparation of Anhydro apo Porfiromycin*

A 31.5 mg. sample of anhydro apo mitomycin B was sealed in a Carius tube with 5 ml. of liquid ammonia and was shaken for 18 hours at room temperature. The seal was broken and the ammonia allowed to evaporate. The product was obtained in 65% weight yield as purple crystals from acetone.

This application is a continuation-in-part of our co-pending application Serial No. 151,155 filed November 9, 1961, now abandoned.

We claim:

1. A compound of the formula:

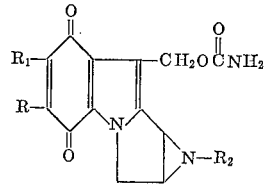

wherein R is a member of the group consisting of lower alkyl, $R_1$ is a member of the group consisting of methoxy and amino and $R_2$ is a member of the group consisting of hydrogen and methyl.

2. Anhydro apo mitomycin B represented by the formula:

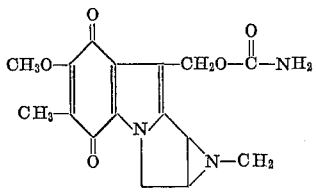

3. Anhydro apo mitomycin A represented by the formula:

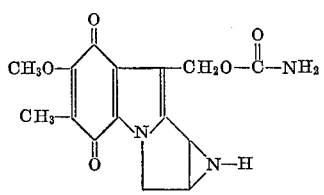

4. Anhydro apo porfiromycin represented by the formula:

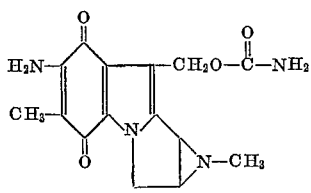

5. A method of preparing a compound of the formula:

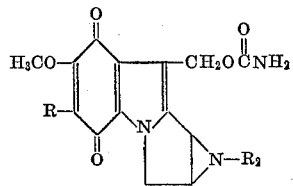

wherein R is a member of the group consisting of lower alkyl and $R_2$ is a member of the group consisting of hydrogen and methyl which comprises contacting a polar solvent solution of a compound of the formula:

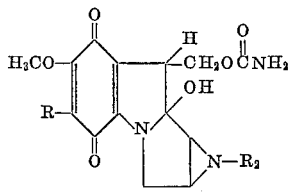

wherein R and $R_2$ have the meanings hereinbefore given with hydrogen in the presence of a finely-divided noble metal catalyst until 1 mole of hydrogen has been absorbed and thereafter reoxidizing the product.

6. A method of preparing anhydro apo mitomycin B of the formula:

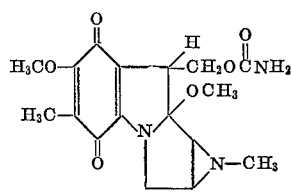

which comprises contacting a polar solvent solution of N-methyl mitomycin A of the formula:

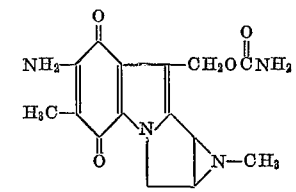

with hydrogen in the presence of a finely-divided noble metal catalyst until about 1 mole of hydrogen has been absorbed and thereafter reoxidizing the product.

7. A method of preparing anhydro apo porfiromycin of the formula:

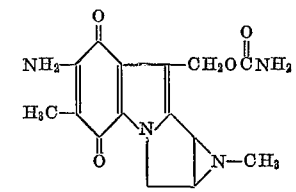

which comprises contacting anhydro apo mitomycin B with liquid ammonia.

No references cited.